United States Patent [19]

Bridges et al.

[11] Patent Number: 4,793,409

[45] Date of Patent: Dec. 27, 1988

[54] METHOD AND APPARATUS FOR FORMING AN INSULATED OIL WELL CASING

[75] Inventors: Jack E. Bridges, Park Ridge; Joseph O. Enk, Lake in the Hills, both of Ill.; Homer L. Spencer; Vincent R. Young, both of Tulsa, Okla.

[73] Assignee: ORS Development Corporation, Tulsa, Okla.

[21] Appl. No.: 64,063

[22] Filed: Jun. 18, 1987

[51] Int. Cl.[4] .................... E21B 19/16; E21B 36/00; F16L 9/14; H05B 3/02

[52] U.S. Cl. .................................... 166/57; 166/60; 166/242; 166/380; 138/146; 156/187; 174/120 C; 174/120 SR; 219/277

[58] Field of Search .................... 166/380, 248, '242, 166/60, 57, 65.1; 156/187; 219/277, 278; 138/105, 149, 146; 174/110 SR, 110 PM, 110 E, 120 C, 120 SR

[56] References Cited

U.S. PATENT DOCUMENTS

| | | | |
|---|---|---|---|
| 3,231,443 | 1/1966 | McNulty | 156/187 |
| 3,842,192 | 10/1974 | Hilker et al. | 174/120 SR |
| 3,852,518 | 12/1974 | Wargotz et al. | 174/110 PM |
| 4,412,124 | 10/1983 | Kobayashi | 219/277 |
| 4,463,805 | 8/1984 | Bingham | 166/248 |
| 4,484,627 | 11/1984 | Perkins | 166/248 |
| 4,577,664 | 3/1986 | Takahashi et al. | 174/110 SR |
| 4,665,281 | 5/1987 | Kamis | 174/120 SR |
| 4,665,305 | 5/1987 | Shirazawa et al. | 219/277 |

*Primary Examiner*—Bruce M. Kisliuk

*Attorney, Agent, or Firm*—Kinzer, Plyer, Dorn, McEachran & Jambor

[57] ABSTRACT

A method and apparatus for forming an electrically conductive externally insulated casing for an oil well of the type in which the casing carries electrical current to a primary heating electrode positioned downhole, using multiple prefabricated casing segments; each casing segment is a long steel pipe having a female thread coupling on one end and a male thread on the other end. Each segment has an insulator covering, over substantially all of its length, that has a figure of merit (erl)/Δ of no more than $4\times10^8$ so that the shunt impedance of the casing to ground can be kept substantially greater than the spreading resistance of the primary heating electrode. The preferred casing segment insulation is in two layers, including a hard, durable inner layer subject to water degradation and an outer water-impervious layer usually applied as tape. The uninsulated portions of joints between segments are covered withan insulator cement in the field and then further covered with a water-impervious tape that overlaps the water-impervious layers on two segments.

43 Claims, 3 Drawing Sheets

10
42
32
31
31
11
12
53
26
33
41
29
21
27
58
13
45
D1
42
$Y_1$
53
41
$Y_0$
I
I
I
13
29
27A
24
28
14
D2
22
25
15
34
D3
23
35
16
29

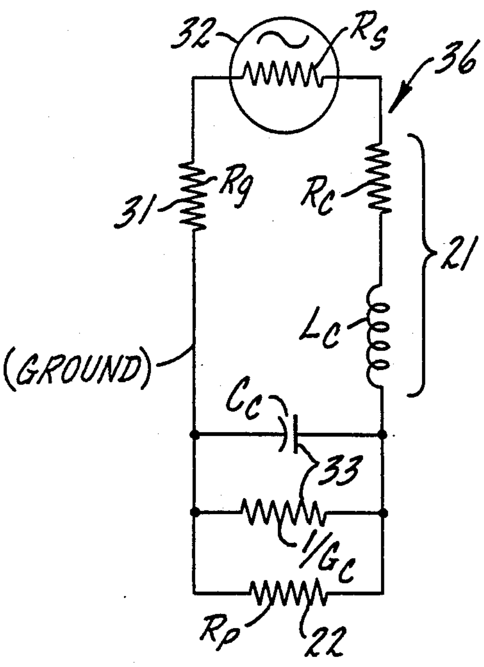
Fig. 2.
Fig. 4.
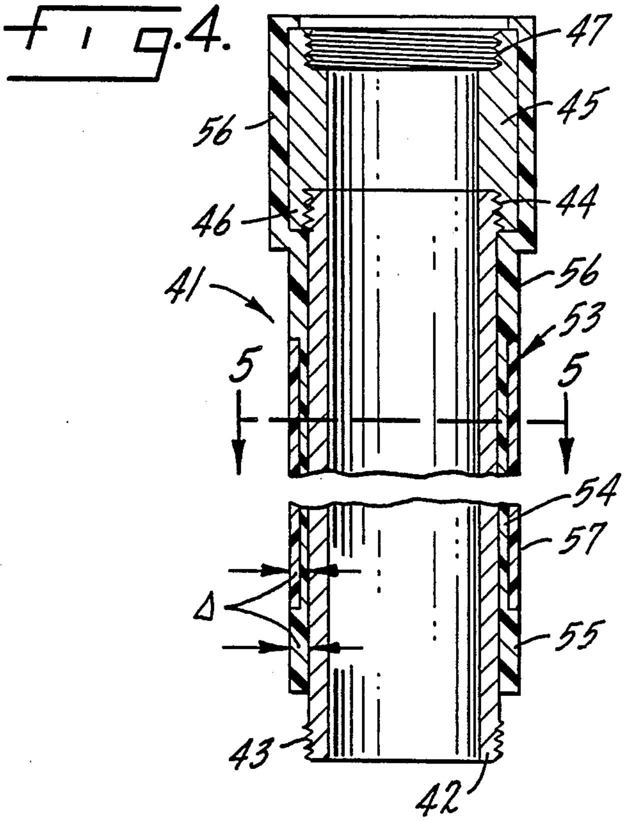
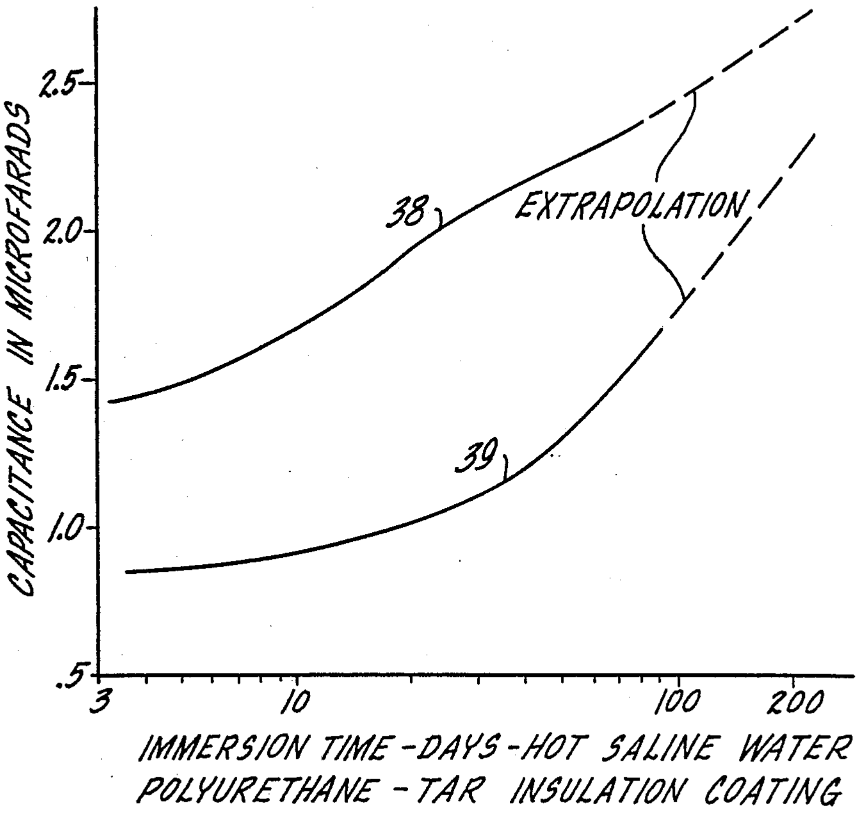
Fig. 3.

METHOD AND APPARATUS FOR FORMING AN INSULATED OIL WELL CASING

BACKGROUND OF THE INVENTION

A major difficulty in extracting oil from deposits of heavy, viscous oils or from tar sand deposits results from the poor mobility of the oil and the requisite movement through the deposit and into an oil well. A number of different techniques and apparatus have been developed for reducing the viscosity of the oil, usually by increasing its temperature. In many instances this is accomplished by electrical heating, including particularly conductive heating of a portion of the oil producing formation or "pay zone" adjacent to the well.

One such method employs a primary heating electrode in ohmic contact with the pay zone. When a voltage differential is established between that electrode and the pay zone, electrical current flows; the current density may be quite high in the immediate vicinity of the primary electrode. As a consequence, a part of the oil producing formation immediately around the wellbore is heated; this reduces tee viscosity and subsequently reduces the excessive pressure drop around the well bore. By so doing, the flow rate of the well can be increased and the ultimate recovery from the reservoir is increased, since less pressure is wasted.

For economical operation of a well heating system of this type, electrical power may be delivered to the primary heating electrode through the conventional metal oil well casing, usually a steel pipe. If efficient heating is to be realized, this requires electrical insulation of the casing from the earth. But most electrical insulating materials, when buried in moist earth, ca only function reasonably well for short periods during which the added capacitance created by the penetration or absorption of moisture into the insulation does not significantly affect performance of the system.

In a power delivery system for heavy-oil well heating, the moisture absorbing capability of casing insulation can seriously degrade performance by radically increasing the capacitance and often the leakage current, between the well casing and the earth. This increases the shunt capacitive reactance currents along the casing and can result in considerable inefficiency. Insulating materials are available which resist moisture absorption (e.g. polyethylene) but many such moisture resistant materials lack the physical or chemical properties needed for oil well processes.

SUMMARY OF THE INVENTION

It is an object of the invention, therefore, to provide a new and improved method of forming an electrically insulated conductive casing for an oil well of the kind in which the casing is used to energize a downhole primary heating electrode, a method that results in a casing having a combination of desirable physical and chemical properties with effective and enduring electrical properties that facilitates long-term economical heating.

Another object of the invention is to provide a new and improved electrically insulated conductive casing segment, and a complete casing made up of those segments, for an electrically heated oil well of the kind in which the casing is used to energize a downhole primary heating electrode; the casing segments and the complete casing afford a combination of desirable physical and chemical properties with effective and enduring electrical properties that facilitates long-term economical heating.

A more specific object of the invention is to provide insulation for the casing of an electrically heated oil well in which the casing energizes a primary heating electrode in the pay zone, which insulation is strong, durable, and abrasion resistant, yet demonstrates minimal degradation with continued exposure to moisture even under adverse temperature conditions.

Accordingly, in one aspect the invention relates to a method of forming a casing in an oil well of the kind comprising an externally insulated electrically conductive casing employed as a conductor carrying electrical current to a heater electrode positioned downhole of the well in alignment with an oil producing formation, comprising the following steps:

A. pre-assembling a plurality of casing segments, each casing segment comprising an elongated metal pipe, each casing segment having an electrical insulator covering on substantially all of its external surface, the insulator covering having a figure of merit $(e_rL)/\Delta$ of no more than $4\times10^8$, after extended immersion in water, wherein $e_r$=relative dielectric constant of the insulator covering at 60 Hz, $\Delta$=thickness of the insulator covering in feet, and L=length of insulated casing in feet;

B. inserting one casing segment partially into the well bore;

C. joining another casing segment end-to-end to the one casing segment;

D. applying electrical insulator material to the joint between the casing segments to afford a continuous external insulator covering approximating the characteristics of the insulator covering on each segment; and repeating steps B through D to complete an electrically conductive externally insulated casing down to approximately the depth of the oil producing formation.

In another aspect the invention relates to a casing segment for use in an oil well of the kind comprising an electrically conductive casing employed as a conductor carrying electrical current to a heater electrode, the heater electrode to be positioned in the lower part of the well in alignment with an oil producing formation. The casing segment comprises an elongated metal pipe and an electrical insulator covering on substantially all of the external surface of the metal pipe; the insulator covering has a figure of merit $(e_rL)/\Delta$ of no more than $4\times10^8$ after extended immersion in water, wherein $e_r$=relative dielectric constant of the insulator covering at 60 Hz, $\Delta$=thickness of the insulator covering in feet, and L=length of insulated casing in feet.

In yet another aspect the invention relates to a casing for an electrically heated oil well of the kind comprising a well bore extending downwardly from the surface of the earth through one or more overburden formations and through an oil producing formation, an electrically conductive externally insulated main casing extending from the surface of the earth down into the well bore to a depth adjacent the top of the oil producing formation, an electrically conductive externally uninsulated primary heating electrode extending downwardly from the casing, through the oil producing formation, at least one secondary heating electrode positioned within one of the overburden and oil producing formations, and electrical power supply means connected to the primary electrode through the main casing and connected to the secondary electrode, for energizing the electrodes for conduction heating of a portion of the oil producing formation adjacent the well. The casing comprises a multiplicity of casing segments interconnected end-to-end; each such casing segment comprises an elongated metal pipe and an electrical insulator covering over the external surface of the metal pipe throughout substantially all of its length, in which $$[G_c]^2 + [\omega C_c]^2 << \left[\frac{1}{R_p}\right]^2$$

wherein: $G_c$=conductance of the insulator covering in mhos;

$C_c$=capacitance of the insulator covering in farads;

$R_p$=spreading resistance of the primary electrode in ohms; and $\mu = \pi f$, where f is frequency.

BRIEF DESCRIPTION OF THE DRAWINGS

FIG. 2 is a simplified equivalent electrical schematic for the monopole heating system of FIG. 1;

FIG. 3 is a graph of the long-term capacitance effect of water immersion of a conventional pipeline coating;

FIG. 4 is a sectional elevation view, on an enlarged scale, of a casing segment suitable for use in constructing an oil well casing like that of FIG. 1;

DESCRIPTION OF THE PREFERRED EMBODIMENTS

Figure 1:
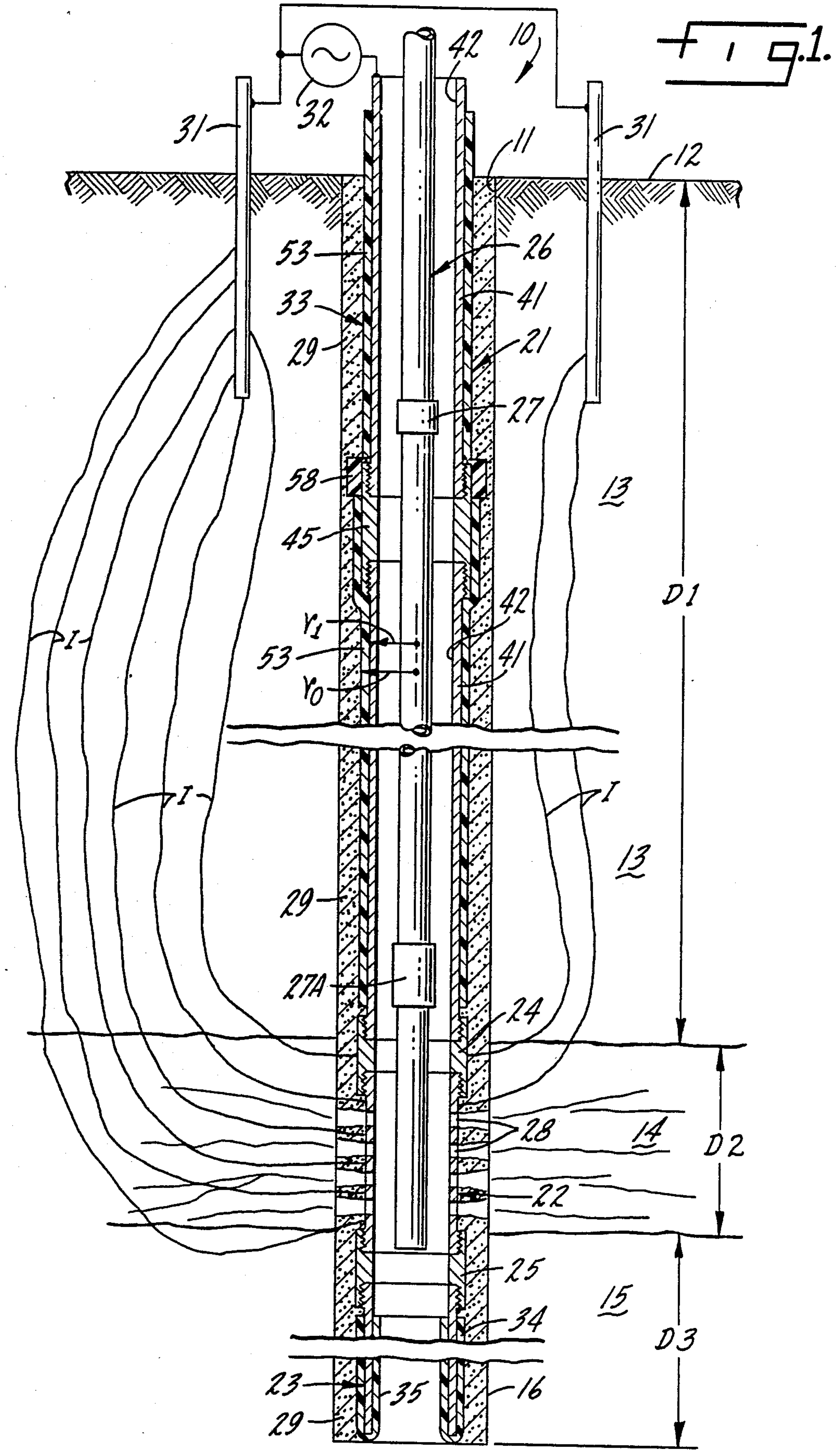
FIG. 1 is a simplified sectional elevation view, somewhat schematic, of an oil well equipped with a monopole electrical heating system that includes a casing comprising one embodiment of the invention.

FIG. 1 is a simplified sectional elevation view of an oil well 10 equipped with a monopole electrical heating system that incorporates a casing comprising one embodiment of the present invention. Oil well 10 comprises a well bore 11 that extends downwardly from the surface of the earth 12 through one or more overburden formations 13 and through an oil producing formation or pay zone 14. Well bore 11 may continue downwardly below the producing formation 14 into an underburden formation 15, affording a rathole 16.

An electrically conductive externally insulated main casing 21, constructed of multiple segments of steel pipe usually having a diameter of about 5.5 inches, extends from above surface 12 down into well bore 11. This main casing 21 is continuous t a depth D1 that ends approximately at the top of pay zone 14. The casing in oil well 10 continues downwardly from section 21 as an uninsulated electrically conductive primary heating electrode 22. Electrode 22 has a length D2 such that it extends approximately to the bottom of the oil producing formation 14. Electrode 22 may be a direct continuation of the main casing 21 and, like the main casing, may be formed of conventional steel pipe. A conventional dual female threaded steel coupling 24 may be used to join electrode 22 to main casing 21; as shown, coupling 2 functions as a part of electrode 22.

In oil wells of the rathole type, as shown in FIG. 1, well 10 may further include a casing 23 that extends down into rathole 16 to a substantial depth below pay zone 14. Casing 23 may be formed in whole or in part from an insulator material, such as resin-impregnated fiberglass, having appropriate physical properties as well as constituting a high dielectric insulator. As shown, however, casing 23 is a length of conventional steel casing pipe, insulated on both its external and internal surfaces and mounted on electrode 22 by a conventional steel coupling 25. Its length is indicated as D3. It should be recognized that FIG. 1 is essentially schematic in nature and that all dimensions, particularly D1–D3, are not accurately portrayed in the drawing.

Oil well 10 may include other conventional features and apparatus, some shown in FIG. 1, some omitted as not closely related to the present invention. Thus, well 10 may include a production tubing 26 extending coaxially into the well casing; tubing 26 usually projects down to the bottom of the oil producing formation 14 or even somewhat below that level. Production tubing 26 is usually formed of a multiplicity of segments of steel tubing joined by couplings 27; one coupling 27A (or more) may be formed of resin-impregnated fiberglass or other electrical insulator material. Electrode 22 has a plurality of apertures 28; these apertures admit oil from the producing formation 14 into the interior of the well casing. Oil well 10, as shown in FIG. 1, may also include cement 29 around the exterior of well bore 11, between the various earth formations 13–15 and the well casing 11–23; the cement may be applied through use of a float shoe (not shown).

A part of the electrical heating system for well 10 is one or more secondary electrodes 31 (two shown) driven into the uppermost overburden formation 13 at a relatively short distance from well 10. Another, adjacent well could also afford the secondary electrode. An electrical power supply 32 is connected to the main casing 21 and is also connected to secondary electrodes 31. To provide electrical isolation for main casing 21, which is usually much longer than electrode 22 or rathole casing 23, an external electrical insulator covering 33 is provided throughout the casing length, a length that corresponds to depth D1 an may be from a few hundred to several thousand feet. The casing extension constituting electrode 22, in pay zone 14, however, has no external insulation; its conductive surface is bared to the pay zone to serve as a primary electrode for heating a portion of the oil producing formation 14 adjacent to well 10. That is, electrical current supplied by source 32 flows down through the main casing 21 to electrode 22, the primary electrode of the monopole heating system. From electrode 22 the current flows outwardly into the oil producing formation 14 and then along dispersed paths back to secondary electrodes 31 and thence is returned to source 32. The heating current paths are generally indicated by lines I.

The key to effective operation of the electrical heating system of well 10 is avoidance of wasteful heating of formations above or below the oil producing formation 14. In the upper portion of the well, these undesired heating losses are effectively precluded by the presence of insulator covering 33 on main casing 21, precluding any significant current flow from the main casing back to the secondary electrodes 41. Below the oil producing formation 14, electrical isolation is afforded by insulation layers 34 and 35 on the outer and inner surfaces of casing 23.

As thus far described, well 1 and its monopole heating system are generally conventional; the monopole heating arrangement affords an efficient and economical technique for heating of the oil producing formation 14 in the area immediately adjacent well 10 and its electrode 22. Dipole arrangements are also known, and the present invention can be used in both dipol and monopole heater systems.

In operation of well 10, the electrical power supply 32 is utilized to establish a substantial voltage differential between the primary heating electrode 22 and the secondary electrode or electrode 31. In a typical well, the potential difference between these electrodes may range from thirty volts to eight hundred volts. The operating frequency for electrical power supply 32 may be a conventional 60 Hz or 50 Hz power frequency, but other frequencies may also be employed.

The configuration of the secondary electrodes 31 should be such that the spreading resistance of these electrodes is small in comparison to the spreading resistance of the primary heating electrode 22.

For reasons of economy, convenience, and consistency with current oil field practices, the individual segments of the main casing 21 are formed of steel pipe. Usually, these segments are about forty feet in length. Because steel has a relatively high resistance when compared with other conductive materials such as aluminum or copper, the series resistance of the main casing 21 is an important factor in determining the overall power delivery efficiency of the heating system for well 10. Another factor of substantial importance in this regard is the quality of the insulation covering 33 on the steel pipe of casing 21. If the quality of the insulation covering is poor, it may exhibit a very high capacity per unit length with respect to the surrounding formations and grout 29. In addition, the insulation covering 33 may exhibit a relatively low resistive impedance to ground. These attributes of insulation covering 33, if present, may lead to significant parasitic losses with respect to the electrical current delivered downhole to primary electrode 22. Moreover, with poor insulation the shunt capacity increases the overall current flow in the conductive steel portion of casing 21 and increases heat losses in the casing itself.

While overall efficiency considerations might appropriately be considered in terms of a rigorous field theory or an appropriate distributed-line equivalent circuit, for purposes of discussion of the present invention a simple equivalent circuit 36 using lumped impedances, as shown in FIG. 2, is adequate for presentation on a qualitative yet reasonably accurate quantitative basis. In circuit 36, $R_s$ is the source impedance of power supply 32, $R_g$ is the spreading resistance of the secondary electrodes 31, $R_c$ is the total series resistance of casing 21 throughout its overall depth D1 from ground surface 12 to the top of the primary heating electrode 22, and $L_c$ is the series inductance of casing 21 due to skin effect. $C_c$ is the total capacitance of casing 21 to the encompassing overburden formations 13, with the assumption that the formations have infinite conductivity. $G_c$ is the total conductance of the insulation 33 of casing 21, again assuming infinite conductivity for the surrounding formations. Finally, $R_p$ is the spreading resistance of the primary electrode, determined approximately by the relationship $$R_p \simeq \frac{\rho}{2\pi H} l_n (H/a) \quad (1)$$

in which $\rho$ is the resistivity of the formation as determined by deep-focused oil well logging equipment, H is the height of primary electrode 22, and a is the outer radius of the primary electrode.

With reference to the equivalent circuit of FIG. 2, it is seen that if the values of $C_c$ and $G_c$ are too large, excessive shunt currents will flow through these components and will cause additional excessive currents to flow in casing 21, as represented by $R_c$ and $L_c$. The overall result is unwanted and highly inefficient parasitic heating losses. In order to assure that these parasitic losses do not occur, or at least are minimized, the characteristics of the insulation covering 33 on the main casing 21 must be such that the following relationship is met:

$$[G_c]^2 + [\omega C_c]^2 << \left[\frac{1}{R_p}\right]^2 \quad (2)$$

This relationship (2) simply states that the shunt impedance from casing 21 to the ground (resistive and capacitive) must be considerably greater than the spreading resistance $R_p$ of the load, electrode 22. If the electrical insulation covering 33 on casing 21 (FIG. 1) is too thin, then capacitance $C_c$ (FIG. 2) is too high because the capacitance is inversely proportional to the insulation thickness. As a consequence, excessive losses occur. If the insulation is too thick, it may easily be too expensive. Furthermore, selection of some insulator materials may increase costs beyond sustainable levels. For example, fiberglass reinforced plastic may be used for the main casing insulator covering 33 but would be quite expensive; furthermore, due to moisture absorption, it might not be satisfactory.

The values for $G_c$ and $C_c$ may be determined as:

$$G_c = \frac{2\pi\sigma}{l_n (r_o/r_i)} \quad (3)$$

$$C_c = \frac{2\pi\epsilon}{l_n (r_o/r_i)} \quad (4)$$

In the foregoing equations $\sigma$ is the conductivity of the insulation, $\epsilon$ is the permittivity of the insulation, and $r_o/r_1$ is the ratio of the outside radius to the inside radius of the insulation.

Increased penetration or absorption of moisture into insulation covering 33 increases both $G_c$ and $C_c$. At least some of the increases in $G_c$ and $C_c$ which would otherwise lead to inefficient power delivery to electrode 22 in the heating system can be offset by increasing the ratio $r_o/r_1$ through increases in the thickness of the insulation covering. On the other hand those increases in $C_c$ due to water absorption may continue over extended periods of time, as demonstrated by curves 38 and 39 showing capacitance changes for a thin and a thick covering of a known polyurethane/tar insulation coating.

Practical considerations also dictate that the insulation covering 33 on main casing 21 must be able to withstand handling by conventional oil well field tools such as chain,, slips, grips, tongs or clamps which utilize sharp jaws like those in pipe wrenches to hold the casing in place during assembly and insertion in well bore 11. Furthermore, as casing 21 is inserted into the bore hole 11 of well 10, it may experience abrasion from rock ledges or from gravel in conglomerate formations. The insulation covering 33 must also be able to withstand relatively high temperatures, frequently of the order of 100° C. or higher, in the lower portion of the well adjacent electrode 22. Moreover, the insulation must be adapted to easy installation under typical oil field conditions. All of these factors must be taken into account, in accordance with the present invention, as decribed in FIGS. 4–6.

Figure 5:
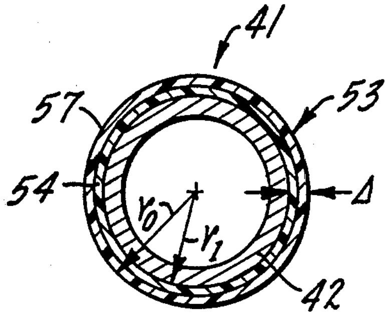
FIG. 5 is a sectional view taken approximately as indicated by line 5—5 in FIG. 4.

FIGS. 4 and 5 illustrate a casing segment 41 to be utilized in the formation of a main casing like casing 21 in well 10, FIG. 1. As shown in FIGS. 4 and 5, casing segment 41 includes an elongated steel pipe 42. Typically, pipe 42 may be formed of inexpensive low carbon steel, with a diameter of approximately 5.5 inches and an overall length of about forty feet. As shown in FIG. 4, the steel pipe 42 has male threads 43 and 44 at its opposite ends.

Casing segment 41 further comprises a short steel coupling 45; coupling 45 usually has an overall length of less than one foot. One end 46 of coupling 45 comprises a female thread that is shown fully engaged with the male thread 44 a the upper end of steel pipe 42. A similar female thread 47 is provided at the other end of coupling 45. In practice, the female threads 46,47 may be continuous.

Casing segment 41, FIGS. 4 and 5, further comprises an electrical insulator covering, generally indicated by reference numeral 53, that extends throughout substantially all of the length of the casing segment exclusive of the male thread end 43. Insulator covering 53 has an overall thickness Δ as indicated in FIGS. 4 and 5. The insulation thickness Δ is essentially constant throughout the length of casing segment 41, in the preferred construction shown in FIG. 4, but there is no necessity to maintain a constant thickness.

As previously noted, selection of the material used for insulation covering on the main casing is critical. An appropriate starting point is the insulation materials used for conventional corrosion resistant pipeline coatings. These coatings are usually of the order of a few millimeters in thickness and are most frequently used in connection with a cathodic protection system which places the pipe at a few volts negative potential with respect to the soil in which it is embedded. Criteria to select such pipeline coatings include tests of adhesion, chemical resistance, flexibility, hardness, abrasion resistance, impact resistance, penetration resistance, resistance to cathodic disbonding, stability at elevated temperatures, soil stress resistance, and weathering resistance. For the present invention, of course, an additional factor of prime importance is the long term effect of water absorption on the electrical properties of the insulation material, as noted previously in connection with FIG. 3.

Materials commonly used for pipeline coatings include a variety of tar materials, usually derived from coal, extruded polyethylene, fusion bonded epoxy resins, and various resin tapes such as polyethylene and polyvinyl chloride tapes, usually with a butyl backing or some other stable adhesive backing. Pipeline coating materials also include various polyurethane materials and combinations of polyurethane with coal tar derived materials.

Because the penetration or absorption of water in the insulating covering greatly increases the capacitance and hence the parasitic currents and losses in an oil well heating system, the water absorption characteristics of any of these materials are important to their use in the oil well environment. Table 1 illustrates this characteristic for various materials, in comparison with a high density polyethylene tape which has minimal absorption and is taken as a standard with a factor of one.

TABLE 1

| Weight Gain Factor Relative to the Moisture Absorbed by High Density Polyethylene Tape | |
|---|---|
| Coal-Tar | 346 |
| Fusion-Bond Epoxy Resin | 30 |
| Polyurethane Resin | 57 |
| PVC Tape | 30 |
| Polyurethane/Coal-Tar | 7 |
| Hi-density Polyethylene Tape | 1 |

(From "The Evaluation of External Pipeline Coatings", K.E.W. Coulson, Western Canadian Regional Conference, National Association of Corrosion Engineers, Feb. 16-18, 1983, Calgary, Alberta, Canada)

As seen in Table 1, coatings derived from coal tar may absorb over three hundred times the amount of water as the standard, the high density polyethylene tape. The best performance of all of these materials, other than the polyethylene, is that provided by the polyurethane/tar coating, for which the weight gain factor due to water absorption is only seven times that of the high density polyethylene tape. Referring back to FIG. 3, however, it is seen that the capacitance characteristic for polyurethane/tar coatings demonstrates a propensity to continue to absorb moisture and to increase its relative dielectric constant with continued exposure to hot saline water. An aging characteristic of this kind might be acceptable for some types of wells, provided the electrical criteria defined by equation (2) were reasonably met. For most wells, however, with long life projections, this characteristic is not acceptable and a covering formed completely from the polyurethane/tar materials ultimately proves too inefficient.

Table 2 shows the results of water immersion testing on the admittance of various insulation covering materials. The after test admittances shown in Table 2 are based upon an immersion test of 110 hours at 180° F. (82° C.) in saline water followed by three cycles of pressurization at three atmospheres absolute followed by a vacuum at 0.2 atmosphere absolute, also while immersed in the hot saline solution (5% NaCl by weight).

TABLE 2

Changes in Admittance/Meter for Various Coatings Before and After Hot Water Immersion and Pressure Cycling Test

| Coating | Admittance Before Mho/m | Admittance After Mho/m | $\frac{1}{\mu C_c}$ 600 meter well ohms |
|---|---|---|---|
| Resin/Sand (a) | $2 \times 10^{-6}$ | $2 \times 10^{-4}$ | 8.9 |
| Flexible RTV (b) | $8 \times 10^{-5}$ | $3 \times 10^{-4}$ | 5.5 |
| Polyurethane/Tar (c) | $2 \times 10^{-6}$ | $1.5 \times 10^{-3}$ | 1.1 |
| High-Durability Polyurethane (d) | $4 \times 10^{-5}$ | $2 \times 10^{-3}$ | 0.8 |

(a) Insulator casting resin, 13% resin and 87% sand, U.S. Pat. No. 4,210,774, Electric Power Research Institute, from Polytech Company, Redwood City, California 94063.
(b) RTV Silicone Rubber adhesive sealant, No. 106, red high temperature, from General Electric Company, Waterford, New York 12188.
(c) PROTEGOL ® UT coating 32-10 two part polyurethane/tar coating compound, form T.I.B. Chemie GmbH, D-6800 Mannheim 81, Federal Republic of Germany.
(d) CAMOLITE ® polyurethane coating, military specification MMS 420, from DeSoto, Inc., DesPlaines, Illinois 60017.

Table 2 also presents the capacitive shunt reactance for each of the insulation covering materials for a well depth of 600 meters. In interpreting this portion of Table 2, it should be kept in mind that the typical electrode resistance ranges from 0.3 to approximately 3 ohms. The coatings shown in Table 2, by themselves, are not satisfactory, particularly because continued aging, with adverse changes, can be anticipated; see FIG. 3.

From the information presented in Tables 1 and 2, it can be seen that conventional pipeline coatings, apart from high density polyethylene tape, do not meet the electrical characteristic requirements previously postulated for the casing in well 10. The one possible exception is the polyurethane/tar combination that appears in both Table 1 and Table 2, but even that material is not really satisfactory because it is susceptible to continued deterioration after pressure cycling, which anticipates the effect of aging in place in the well.

On the other hand, the physical characteristics of high density polyethylene tape in terms of adhesion, chemical resistance, and resistance to abrasion and penetration are not really satisfactory as applied to an oil well casing. The deficiencies of the polyethylene tape, in these physical and chemical respects, makes it unsatisfactory if used by itself for the insulation covering of an oil well casing.

These problems are resolved in casing segment 41, FIGS. 4 and 5, by use of a dual-layer construction for insulator covering 53. Thus, insulator covering 53 includes an inner layer 54 formed of a hard, durable insulation material having a high impact resistance and also highly resistant to physical penetration. This insulation material is preferably one of the better pipeline insulation materials such as the polyurethane/tar combination coating or a fusion bonded epoxy resin. Short end portions 55 and 56 of this inner coating 54 are made thicker than the middle portion of the coating that covers the major part, central of the overall length of casing segment 41. Typically, the end portions 55 and 56 of the initial or inner layer 54 of insulation material may be about four feet or less in length. The thick end portion 56 of layer 54 extends over coupling 45 as can be seen in FIG. 4. Typical thicknesses are:

| | |
|---|---|
| layer 54 | 40–60 mils |
| layers 55, 56 | 80–100 mils |
| layer 57 | 60–80 mils. |

The inner layer 54 provides the desired physical and chemical properties for insulation covering 53. It should have a relatively high temperature rating, typically 80° to 110° C. Chemical resistance should show no obvious effects such as softening, disbonding, or liquid penetration (by petroleum fluids or diesel oil) after immersion for over twelve months. Hardness should be no less than 50 Shore D under ASTM test method DD2240-75; impact resistance should be no less than 60 Kg-cm at 20° C. under the following weight test, ASTM G14-77. The penetration resistance should be no more than 15% under the ASTM blunt rod method G17-77. These requirements are met by most fusion bonded epoxy resins and by polyurethane/tar coating used on pipelines. Ceramic coatings may be suitable.

The thick end portions 55 and 56 of the inner layer 54 of hard, durable insulation material are provided so that the insulation is not penetrated by typical oil well field casing tools such as slips, grips, clamps, etc. But the main central length of segment 41 is not as likely to be engaged by such field tools. It is provided with an outer layer 57 of a material substantially impervious to water. The preferred material for layer 57 is high density polyethylene. Other materials that may be used for the outer layer 57 include polyvinylidene chloride, polystyrene-butadiene copolymers, and ether based polyurethane film. For the water impervious outer layer 57, a semi-crystalline wax may also be employed.. The outer layer 57 of insulation covering 53 should show a weight increase at 21° C. of no more than 0.2% under ASTM test method D570-63. Layer 57 may be applied as a tape wrapping or may be a film extruded over or otherwise applied to the casing segment.

Figure 6:
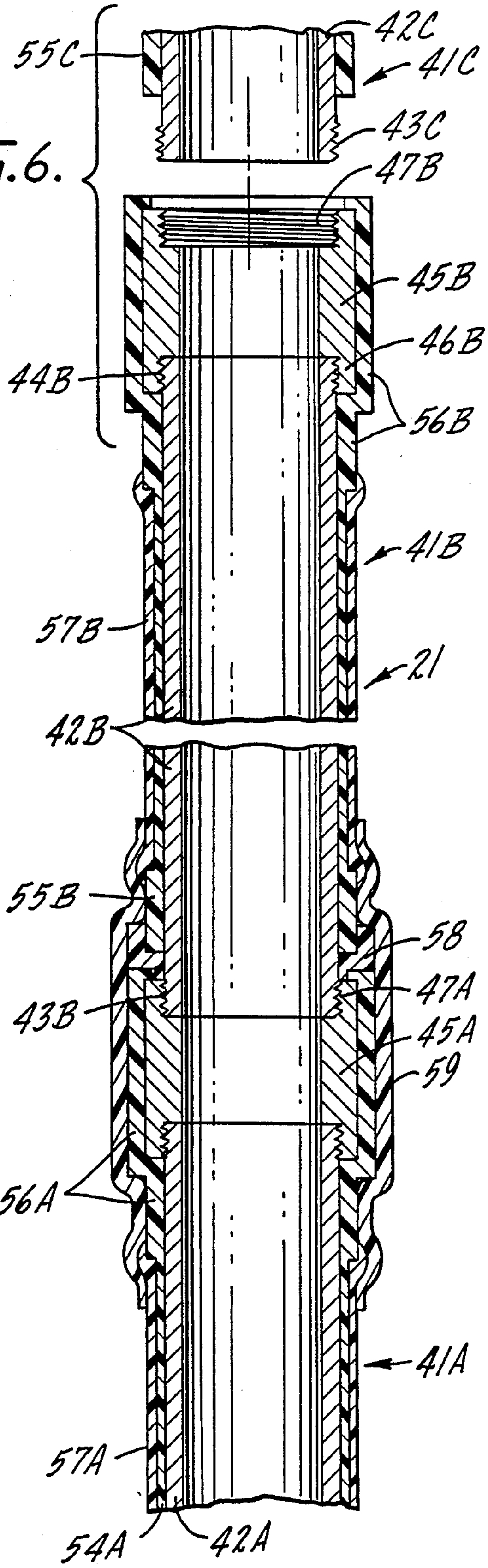
FIG. 6 is a view like FIG. 4, but showing plural casing segments, used to explain a part of the method of the invention.

Casing segments 41 are preferably prefabricated and shipped to the oil well site in the assembled, insulated form shown in FIGS. 4 and 5. At the oil well, a multiplicity of these casing segments are assembled to form a complete main casing 21 in the manner best illustrated in FIG. 6. FIG. 6 shows three insulated well casing segments 41A, 41B, and 41C which are inserted in that sequence into well 10 in forming its main casing 21 (FIG. 1). It may be assumed that casing segment 41A is the portion of casing 21 immediately above electrode 22; however, segment 41A could be any portion of casing 21.

Casing segment 41A, when inserted in the well bore, is held in position by the slips used for the well. The next casing segment 41B is then aligned with segment 41A and its lowermost male thread 43B is screwed into the female thread 47A of coupling 45A on casing segment 41A by rotating one section of casing with respect to the other in conventional manner. That is, casing segment 41B is assembled to the next lower segment 41A in the same way that segments of an uninsulated well casing are put together in conventional field practice.

After the two casing segments 41A and 41B of the casing have been joined as shown in FIG. 6, there is a remaining portion, with coupling 45A at its center, that is not covered by the water-impervious layer 57A of segment 41A or the corresponding water barrier layer 57B of segment 41B. This unprotected portion of the inner insulation coating, comprising the insulation coating sections 56A and 55B, is usually about eight feet in length. Moreover, there is likely to be a very small portion o steel pipe 42B, immediately above the joint with coupling 45A, that is externally exposed.

At this juncture, an insulator material is applied to the joint between casing segments 41A and 41B. This is best accomplished by wrapping a flexible band (not shown) around the joint and pouring a fast-setting insulator cement material into it to form an inner insulator 58. The flexible band can be a plastic strip or even a simple band of cardboard. A preferred material for the inner insulator layer 58 of the joint is a fast-setting combination of resin and silica sand, such as material (a) in Table 2. When this inner insulator 58 has set up, which may take only a matter of a few minutes, an outer layer of water-impervious material 59 is applied over the entire joint structure, overlapping both the water-impervious layer 57A of segment 11A and the similar water barrier layer 57B of casing segment 41B. The outer water-impervious layer 59 may actually be two layers, an inner wrapping of a low density, highly flexible tape that assures effective moisture resistance by close conformance to the configuration of insulator elements 56–58, and an outer covering of a high density tape. Polyethylene is a suitable material for the layer 59; any of the materials suitable for layers 57 may also be used for layers 59.

This completes the joining of casing segment 41B end-to-end with segment 41A and the application of electrical insulator material to the joint between the two casing segments. As will be apparent from FIG. 6, the technique employed to form the joint affords a continuous external insulator covering at the joint which approximates the characteristics of the insulator covering of each casing segment. At this stage, the partially completed main casing can be lowered into the well bore by a distance equal to one casing length and the next casing segment 41C can be mounted in the coupling 45B atop segment 41B. The continuous insulation required for casing 21 is thus provided by the composite covering afforded by insulation elements 54–59 of the casing assembly of FIG. 6, and that composite covering has the overall physical, chemical, and electrical properties required for economical, efficient heating in the well.

It will be recognized that the assembly method described in conjunction with FIGS. 4–6 can be varied. For example, it is not essential to pre-assemble a coupling 45 on each steel pipe 42 prior to applying the inner layer 54–56 of insulation covering 53. Instead, the insulator covering may be separately applied to the couplings and the insulated couplings sent to the oil well to be mounted on the casing segment pipes. But this arrangement, in reducing the degree of prefabrication, is likely to lead to increased costs, particularly since an additional in-situ insulator ring-like element 58 is likely to be necessary.

I claim:

1. A method of forming a casing in an oil well comprising an externally insulated electrically conductive casing employed as a conductor carrying electrical current to a heater electrode positioned downhole in the well in alignment with an oil producing formation, comprising the following steps:

(A) pre-assembling a plurality of casing segments, each casing segment comprising an elongated metal pipe, each casing segment having an electrical insulator covering on substantially all of its external surface; the insulator covering having a figure of merit $(e_r L)/\Delta$ of no more than $4\times10^8$, after extended immersion in water, wherein $e_r$=reaative dielectric constant of the insulator covering at 60 Hz, $\Delta$=thickness of the insulator covering in feet, and L=length of insulated casing in feet;

(B) inserting one casing segment partially into the well;

(C) joining another casing segment end-to-end to the one casing segment;

(D) applying electrical insulator material to the joint between the casing segments to afford a continuous external insulator covering approximating the electrical insulation characteristics of the insulator covering on each segment; and repeating steps B through D to complete an electrically conductive externally insulated casing down to approximately the depth of the oil producing formation.

2. A method of forming an electrically insulated casing in an oil well, according to claim 1, in which the insulator covering as formed in step A, has:

a Shore D hardness of at least 50;

an impact resistance of at least 60 Kg-cm at 20° C.;

a blunt rod penetration of no more than 15%; and a water absorption of no more than 0.2% by weight at 21° C.

3. A method of forming an electrically insulated casing in an oil well, according to claim 1, in which, in step A, the insulator covering on each pipe segment is formed in sequential layers as:

(A1) an inner layer of a hard, durable insulation material subject to degradation of its electrical insulation properties by water absorption; and (A2) an outer layer of a material substantially impervious to water.

4. A method of forming an electrically insulated casing in an oil well, according to claim 3, in which the inner layer of step A1 is formed from an insulation material selected from the group consisting of fusion-bonded epoxy resin and polyurethane/tar.

5. A method of forming an electrically insulated casing in an oil well, according to claim 3, in which the outer layer of step A2 is formed by a wrapping of a water-impervious tape.

6. A method of forming an electrically insulated casing in an oil well, according to claim 3, in which the outer layer of step A2 is formed from a material from the group consisting of polyethylene, polyvinylidene chloride, polystyrene-butadiene copolymers, ether based polyurethane film, and semi-crystalline wax.

7. A method of forming an electrically insulated casing in an oil well, according to claim 1, in which the insulator material applied in step D comprises a rapid setting dielectric cement.

8. A method of forming an electrically insulated casing in an oil well, according to claim 7, in which, in step D, the dielectric cement is covered by an outer layer that is essentially impervious to water.

9. A method of forming an electrically insulated casing in an oil well, according to claim 8, in which the outer layer of step D is formed from a material from the group consisting of polyethylene, polyvinylidene chloride, polystyrene-butadiene copolymers, either based polyurethane film, and semi-crystalline wax.

10. A method of forming an electrically insulated casing in an oil well, according to claim 8, in which the outer layer of step D is formed by a wrapping of water-impervious tape.

11. A method of forming an electrically insulated casing in an oil well, according to claim 7, in which the insulator covering as formed in step A, has:

a Shore D hardness of at least 50;

an impact resistance of at least 60 Kg-cm at 20° C.;

a blunt rod penetration of no more than 15%; and a water absorption of no more than 0.2% by weight at 21° C.

12. A method of forming an electrically insulated casing in an oil well, according to claim 1, in which each pipe segment is a steel pipe that has a male thread at each end;

a short steel coupling having a female thread in each end is mounted on one end of each pipe segment; and the electrical insulator covering of each segment extends over the external surface of the coupling.

13. A method of forming an electrically insulated casing in an oil well, according to claim 12, in which the insulator covering as formed in step A, has:

a Shore D hardness of at least 50;

an impact resistance of at least 60 Kg-cm at 20° C.;

a blunt rod penetration of no more than 15%; and a water absorption of no more than 0.2% by weight at 21° C.

14. A method of forming an electrically insulated casing in an oil well, according to claim 12, in which, in step A, the insulator covering on each steel pipe segment is formed in sequential layers as:

(A1) an inner layer of a hard, durable insulation material subject to degradation of its electrical insulation properties by water absorption; and (A2) an outer layer of a material essentially impervious to water.

15. A method of forming an electrically insulated casing in an oil well, according to claim 14, in which the inner layer of step A1 is formed from an insulation material selected from the group consisting of fusion-bonded epoxy resin and polyurethane/tar.

16. A method of forming an electrically insulated casing in an oil well, according to claim 14, in which the outer layer of step A2 is formed by a wrapping of a water-impervious tape.

17. A method of forming an electrically insulated casing in an oil well, according to claim 14, in which the outer layer of step A2 is formed from a material from the group consisting of polyethylene, polyvinylidene chloride, polystyrene-butadiene copolymers, ether-based polyurethane film, and semi-crystalline wax.

18. A method of forming an electrically insulated casing in an oil well, according to claim 14, in which:

the outer layer of step A2 is terminated a short distance from the ends of each casing segment;

the insulator covering applied in step D comprises an inner layer of an insulation material subject to degradation of its electrical insulation properties by water absorption covered by an outer layer of a water-impervious material; and the outer layer of water-impervious material applied in step D overlaps a part of the outer layer of step A2.

19. A method of forming an electrically insulated casing in an oil well, according to claim 18, in which the outer layer of step D is formed by a wrapping of a water-impervious tape.

20. A method of forming an electrically insulated casing in an oil well, according to claim 19, in which the material for the tape used in the outer layer of step D is from the group consisting of polyethylene, polyvinylidene chloride, polystyrene-butadiene copolymers, ether based polyurethane film, and semi-crystalline wax.

21. A casing segment for use in an oil well comprising an electrically conductive casing employed as a conductor carrying electrical current to a heater electrode, the heater electrode to be positioned in the lower part of the well in alignment with an oil producing formation, the casing segment comprising:

an elongated metal pipe;

and an electrical insulator covering on substantially all of the external surface of the metal pipe;

the insulator covering having a figure of merit $(e_r L)/\Delta$ of no more than $4\times10^8$, after extended immersion in water, wherein $e_r$ = relative dielectric constant of the insulator covering at 60 Hz, $\Delta$ = thickness of the insulator covering in feet, and L = length of insulated casing in feet.

22. A casing segment for use in an oil well, according to claim 21, in which the insulator covering comprises:

an inner layer of a hard, durable insulation material subject to degradation of its electrical insulation properties by water absorption; and an outer layer of a material substantially impervious to water.

23. A casing segment for use in an oil well, according to claim 22, in which the inner layer is formed from an insulation material selected from the group consisting of fusion-bonded epoxy resin and polyurethane/tar.

24. A casing segment for use in an oil well, according to claim 22, in which the outer layer is formed by a wrapping of a water-impervious resin tape.

25. A casing segment for use in an oil well, according to claim 21, in which the insulator covering has:

a Shore D hardness of at least 50;

an impact resistance of at least 60 Kg-cm at 20° C.;

a blunt rod penetration of no more than 15%; and a water absorption of no more than 0.2% by weight at 21° C. at 21° C.

26. A casing segment for use in an oil well, according to claim 22, in which the outer layer is formed from a material from the group consisting of polyethylene, polyvinylidene chloride, polystyrene-butadiene copolymers, ether-based polyurethane film, and semi-crystalline wax.

27. A casing segment for use in an oil well, according to claim 21, in which:

the metal pipe is a steel pipe that has a male thread at each end;

the casing segment further comprises a short steel coupling, having a female thread in each end, mounted on one end of the steel pipe; and the electrical insulator covering extends over the external surface of the coupling.

28. A casing segment for use in an oil well, according to claim 27, in which the insulator covering comprises:

an inner layer of a hard, durable insulation material having a Shore D hardness of at least 50, an impact resistance of at least 60 Kg.-cm. at 20° C., and a blunt rod penetration of no more than 15% but subject to degradation of its electrical insulation properties by water penetration and absorption; and an outer layer of a material substantially impervious to water.

29. A casing segment for use in an oil well, according to claim 28, in which the inner layer is formed in sequential layers as:

(A1) an inner layer of a hard, durable insulation material subject to degradation of its electrical insulation properties by water absorption; and (A2) an outer layer of a material substantially impervious to water.

30. A casing segment for use in an oil well, according to claim 28, in which the outer layer is formed by a wrapping of a water-impervious tape.

31. A casing segment for use in an oil well, according to claim 27, in which the insulator covering has:

a Shore D hardness of at least 50;

an impact resistance of at least 60 Kg-cm at 20° C.;

a blunt rod penetration of no more than 15%; and a water absorption of no more than 0.2% by weight

32. A casing segment for use in an oil well, according to claim 28, in which the outer layer material is from the group consisting of polyethylene, polyvinylidene chloride, polystyrene-butadiene copolymers, ether based polyurethane, and semi-crystalline wax.

33. In an electrically heated oil well comprising:

a well bore extending downwardly from the surface of the earth through one or more overburden formations and through an oil producing formation;

an electrically conductive externally insulated main casing extending from the surface of the earth down into the well bore to a depth adjacent the top of the oil producing formation;

an electrically conductive externally uninsulated primary heating electrode extending downwardly from the casing, through the oil producing formation;

at least one secondary heating electrode positioned within one of the overburden and oil producing formations;

and electrical power supply means connected to the primary electrode through the main casing and connected to the secondary electrode, for energizing the electrodes for conduction heating of a portion of the oil producing formation adjacent the well;

a casing which comprises a multiplicity of casing segments interconnected end-to-end, each such casing segment comprising:

an elongated metal pipe;

and an electrical insulator covering on substantially all of the external surface of the metal pipe;

in which $$[G_c]^2 + [\omega C_c]^2 << \left[\frac{1}{R_p}\right]^2$$

wherein:

$G_c$=conductance of the insulator covering in mhos;

$C_c$=capacitance of the insulator covering in farads;

$R_p$=spreading resistance of the primary electrode in ohms; and $\mu=2\pi f$, where f is frequency.

34. A casing for an electrically heated oil well according to claim 33 in which, in each segment of the casing, the insulator covering comprises:

an inner layer of a hard, durable insulation material subject to degradation of its electrical insulation properties by water absorption; and an outer layer of a material substantially impervious to water.

35. A casing for an electrically heated oil well according to claim 34 in which, in each segment of the casing, the inner layer is formed from an insulation material selected from the group consisting of fusion-bonded epoxy resin and polyurethane/tar.

36. A casing for an electrically heated oil well according to claim 34 in which, in each segment of the casing, the outer layer of the insulation is formed by a wrapping of a water-impervious tape.

37. A casing for an electrically heated oil well according to claim 34 in which, in each segment of the casing the outer layer is formed from a resin from the group consisting of polyethylene, polyvinylidene chloride, polystyrene-butadiene copolymers, ether based polyurethane film, and semi-crystalline wax.

38. A casing for an electrically heated oil well according to claim 33 in which, in each segment of the casing:

the metal pipe is a steel pipe that has a male thread at each end;

the casing segment further comprises a short steel coupling, having a female thread at each end, mounted on one end of the steel pipe; and the electrical insulator covering extends over the external surface of the coupling.

39. A casing for an electrically heated oil well according to claim 38 in which, in each segment of the casing, the insulator covering comprises:

an inner layer of a hard, durable insulation material subject to degradation of its electrical insulation properties by water absorption; and an outer layer of a material substantially impervious to water.

40. A casing for an electrically heated oil well according to claim 39 in which, in each segment of the casing, the inner layer is formed from an insulation material selected from the group consisting of fusion-bonded epoxy resin and polyurethane/tar.

41. An electrically heated oil well according to claim 39 in which, in each segment of the casing, the outer layer of the insulation is formed by a wrapping of a water-impervious tape.

42. A casing for an electrically heated oil well according to claim 39 in which, in each segment of the casing,, the outer layer material is from the group consisting of polyethylene, polyvinylidene chloride, polystyrene-butadiene copolymers, ether based polyurethane film and semi-crystalline wax.

43. A casing for an electrically heated oil well according to claim 33, in which the insulator covering has a Shore D hardness of at least 50;

an impact resistance of at least 60 Kg-cm at 20° C.;

a blunt rod penetration of no more than 15%; and a water absorption of no more than 0.2% by weight at 21° C.

* * * * *